United States Patent [19]

Dazzi et al.

[11] 4,292,232
[45] Sep. 29, 1981

[54] PROCESS FOR THE MASS COLORATION OF THERMOPLASTICS WITH ANTHRAQUINONYLAMINOTRAIZINES

[75] Inventors: Joachim Dazzi, Riehen; Max Jost, Oberwil; Arnold Wick, Therwil, all of Switzerland

[73] Assignee: Ciba-Geigy Corporation, Ardsley, N.Y.

[21] Appl. No.: 93,644

[22] Filed: Nov. 13, 1979

[30] Foreign Application Priority Data

Nov. 23, 1978 [CH] Switzerland ............ 12027/78

[51] Int. Cl.³ ............................................. C08L 67/00
[52] U.S. Cl. ................................. 260/40 P; 260/42.21
[58] Field of Search ................. 260/40 R, 40 P, 42.21

[56] References Cited

U.S. PATENT DOCUMENTS

| 3,163,551 | 12/1964 | Staeuble et al. | 544/187 |
| 3,349,089 | 10/1967 | Kazankov et al. | 544/187 |
| 3,459,729 | 8/1969 | Crotti et al. | 544/187 |
| 4,198,205 | 4/1980 | Elser et al. | 544/187 |

OTHER PUBLICATIONS

Chemical Abstracts, vol. 85:193386s; 1976.
Chemical Abstracts, vol. 77:5828a; 1972.
Chemical Abstracts, vol. 84:180931v; 1976.

Primary Examiner—Lewis T. Jacobs
Attorney, Agent, or Firm—Luther A. R. Hall

[57] ABSTRACT

A process for the mass coloration of thermoplastics with anthraquinonylaminotriazines of the formula

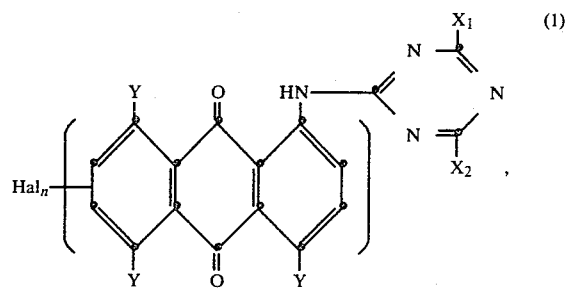

wherein each of $X_1$ and $X_2$ is an alkylmercapto or arylmercapto group or a group of the formula $-NR_1R_2$, in which each of $R_1$ and $R_2$ is alkyl, cycloalkyl, aralkyl or aryl, and $R_2$ can additionally be hydrogen, or $R_1$ and $R_2$ together with the nitrogen atom to which they are attached and optionally a further heteroatom form a 5- or 6-membered ring, one Y is a hydrogen or chlorine atom, a hydroxy, arylmercapto, alkanoylamino or aroylamino group, or a group of the formula

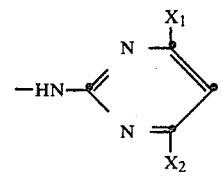

and the other Ys are hydrogen atoms, Hal is a chlorine or bromine atom, and n is 0 or 1. Yellow to orange colored fibres of clear shade, good color strength and fastness properties are obtained.

10 Claims, No Drawings

PROCESS FOR THE MASS COLORATION OF THERMOPLASTICS WITH ANTHRAQUINONYLAMINOTRAIZINES

The present invention relates to a process for the mass colouration of thermoplastics with anthraquinonylaminotriazines of the formula

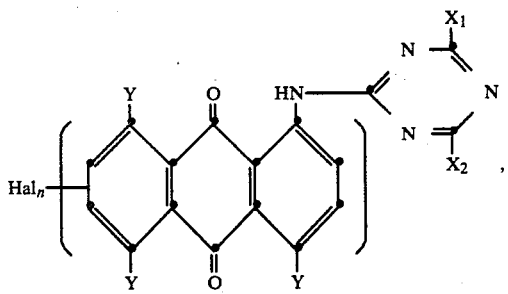 (1)

wherein each of $X_1$ and $X_2$ is an alkylmercapto or arylmercapto group or a group of the formula $-NR_1R_2$, in which each of $R_1$ and $R_2$ is alkyl, cycloalkyl, aralkyl or aryl, and $R_2$ can additionally be hydrogen, or $R_1$ and $R_2$ together with the nitrogen atom to which they are attached and optionally a further heteroatom form a 5- or 6-membered ring, one Y is a hydrogen or chlorine atom, a hydroxy, arylmercapto, alkanoylamino or aroylamino group, or a group of the formula

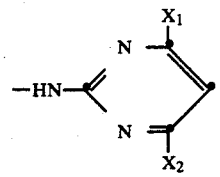

and the other Ys are hydrogen atoms, Hal is a chlorine or bromine atom, and n is 0 or 1.

Alkylmercapto groups represented by $X_1$ and $X_2$ in formula (1) are preferably those containing 1 to 6 carbon atoms. Suitable arylmercapto groups are e.g. naphthylmercapto groups and, in particular, phenylmercapto groups which are unsubstituted or substituted by chlorine atoms or alkyl or alkoxy groups, each of 1 to 6 carbon atoms. Where $X_1$ and $X_2$ are groups of the formula $-NR_1R_2$, the preferred meanings of $R_1$ and $R_2$ are alkyl groups of 1 to 20 carbon atoms, alkoxyalkyl groups, cycloalkyl groups of 5 to 10 carbon atoms, benzyl or phenylethyl groups, or phenyl groups which are unsubstituted or substituted by chlorine atoms or alkyl or alkoxy groups, each of 1 to 6 carbon atoms, while $R_2$ can additionally be hydrogen.

The two radicals $R_1$ and $R_2$ together with the nitrogen atom to which they are attached can also form e.g. a piperidine or morpholine ring.

An arylmercapto group Y is preferably a phenylmercapto group which can be substituted by chlorine atoms or alkyl or alkoxy groups, each of 1 to 6 carbon atoms. Y can also be an alkanoylamino group of 2 to 6 carbon atoms or a benzoylamino group which is unsubstituted or substituted by chlorine atoms or alkyl or alkoxy atoms of 1 to 6 carbon atoms, but is in particular a hydrogen atom or a OH group. n is preferably 0.

The anthraquinonylaminotriazine compounds to be used in accordance with the invention are known compounds. They are advantageously obtained by condensation of a chlorotriazine of the formula

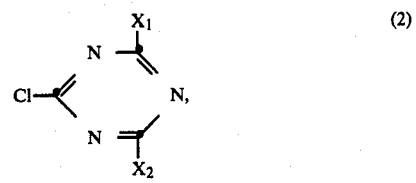 (2)

with the corresponding aminoanthraquinone, for example 1-aminoanthraquinone, 1-aminoanthraquinone-3-, -4-, -5-, -6- or -7-chloroanthraquinone, 1-aminoanthraquinone-4-hydroxyanthraquinone, 1-aminoanthraquinone-4-, -5- or -8-phenylmercaptoanthraquinone, 1-aminoanthraquinone-4- or -5-acetylaminoanthraquinone, 1-aminoanthraquinone-4- or -5-benzoylaminoanthraquinone.

The triazines of the formula (2) are obtained by the stepwise replacement of two chlorine atoms in cyanuric chloride by the amines or mercaptans $X_1H$ and $X_2H$.

The following amines are cited as examples: methylamine, ethylamine, n-propylamine, isopropylamine, n-butylamine, isobutylamine, sec-butylamine, n-hexylamine, n-octylamine, n-decylamine, n-dodecylamine, n-hexadecylamine, or n-octadecylamine, dimethylamine, diethylamine, di-n-propylamine or di-n-butylamine, β-methoxyethylamine, γ-methoxy-n-propylamine or γ-isopropoxy-n-propylamine, cyclohexylamine, dicyclohexylamine, benzylamine, phenylethylamine, aniline, o-, m- or p-toluidine, N-methylaniline, N-ethylaniline or N-n-butylaniline, 1-aminonaphthalene, piperidine or morpholine.

Table I lists a number of anthraquinonylaminotriazines of the formula

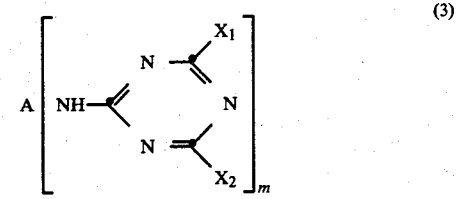 (3)

wherein A is the 1-anthraquinonyl radical, m is 1, and the meanings of $X_1$ and $X_2$ are indicated in columns II and III.

TABLE I

| No. | $X_1$ | $X_2$ |
|---|---|---|
| 1 | β-methoxyethylamino | β-methoxyethylamino |
| 2 | γ-methoxypropylamino | γ-methoxypropylamino |
| 3 | γ-isopropoxypropylamino | γ-isopropoxypropylamino |
| 4 | benzylamino | benzylamino |
| 5 | phenylethylamino | phenylethylamino |
| 6 | n-hexadecylamino | n-hexadecylamino |
| 7 | n-octadecylamino | n-octadecylamino |
| 8 | methylamino | ethylamino |
| 9 | methylamino | n-butylamino |
| 10 | methylamino | n-hexadecylamino |
| 11 | ethylamino | n-octadecylamino |
| 12 | methylamino | dimethylamino |
| 13 | methylamino | diethylamino |
| 14 | methylamino | di-n-propylamino |
| 15 | methylamino | di-n-butylamino |
| 16 | ethylamino | dimethylamino |
| 17 | methylamino | anilino |
| 18 | ethylamino | anilino |
| 19 | isopropylamino | anilino |
| 20 | n-butylamino | anilino |

TABLE I-continued

| No. | X₁ | X₂ |
|---|---|---|
| 21 | n-hexadecylamino | anilino |
| 22 | n-octadecylamino | anilino |
| 23 | methylamino | N-methyl-anilino |
| 24 | ethylamino | N-methyl-anilino |
| 25 | dimethylamino | diethylamino |
| 26 | dimethylamino | diisopropylamino |
| 27 | dimethylamino | di-n-butylamino |
| 28 | dimethylamino | N-methyl-anilino |
| 29 | di-isopropylamino | N-methyl-anilino |
| 30 | di-n-butylamino | N-methyl-anilino |
| 31 | anilino | N-methyl-anilino |
| 32 | N-methyl-anilino | N-ethyl-anilino |
| 34 | ethylmercapto | methylmercapto |
| 35 | ethylmercapto | n-propylmercapto |
| 36 | ethylmercapto | n-butylmercapto |
| 37 | ethylmercapto | n-hexadecylmercapto |
| 38 | ethylmercapto | n-octadecylmercapto |
| 39 | methylmercapto | phenylmercapto |
| 40 | ethylmercapto | phenylmercapto |
| 41 | anilino | phenylmercapto |
| 42 | N-methylanilino | phenylmercapto |
| 43 | N-ethylanilino | phenylmercapto |
| 44 | methylamino | methylmercapto |
| 45 | methylamino | ethylmercapto |
| 46 | methylamino | n-propylmercapto |
| 47 | methylamino | n-butylmercapto |
| 48 | methylamino | n-hexadecylmercapto |
| 49 | methylamino | n-octadecylmercapto |
| 50 | ethylamino | methylmercapto |
| 51 | diethylamino | methylmercapto |
| 52 | dimethylamino | methylmercapto |
| 53 | dimethylamino | ethylmercapto |
| 54 | diethylamino | ethylmercapto |
| 55 | di-n-butylamino | ethylmercapto |
| 56 | dimethyamino | n-propylmercapto |
| 57 | anilino | methylmercapto |
| 58 | anilino | ethylmercapto |
| 59 | anilino | n-propylmercapto |
| 60 | anilino | n-butylmercapto |
| 61 | anilino | n-hexadecylmercapto |
| 62 | anilino | n-octadecylmercapto |
| 63 | N-methylanilino | methylmercapto |
| 64 | N-ethylanilino | methylmercapto |

Table II lists further anthraquinonylaminotriazines of the formula (3), wherein m is 2, A is the anthraquinone radical which is bonded to the triazinylamino groups in the positions indicated in column II, and $X_1$ and $X_2$ have the meanings given in columns III and IV.

TABLE II

| No. | Position | X₁ | X₂ |
|---|---|---|---|
| 65 | 1,4 | β-methoxyethylamino | β-methoxyethylamino |
| 66 | 1,5 | β-methoxyethylamino | β-methoxyethylamino |
| 67 | 1,4 | γ-methoxypropylamino | γ-methoxypropylamino |
| 68 | 1,5 | γ-methoxypropylamino | γ-methoxypropylamino |
| 69 | 1,4 | γ-isopropoxypropyl-amino | γ-isopropxypropylamino |
| 70 | 1,5 | γ-isopropoxypropyl-amino | γ-isopropxypropylamino |
| 71 | 1,4 | benzylamino | benzylamino |
| 72 | 1,5 | benzylamino | benzylamino |
| 73 | 1,4 | n-hexadecylamino | n-hexadecylamino |
| 74 | 1,5 | n-hexadecylamino | n-hexadecylamino |
| 75 | 1,4 | methylamino | methylamino |
| 76 | 1,5 | methylamino | methylamino |
| 77 | 1,4 | butylamino | butylamino |
| 78 | 1,5 | butylamino | butylamino |
| 79 | 1,4 | dimethylamino | dimethylamino |
| 80 | 1,5 | dimethylamino | dimethylamino |
| 81 | 1,4 | morpholyl | morpholyl |
| 82 | 1,5 | morpholyl | morpholyl |
| 83 | 1,4 | anilino | anilino |
| 84 | 1,5 | anilino | anilino |
| 85 | 1,4 | phenylmercapto | phenylmercapto |
| 86 | 1,5 | phenylmercapto | phenylmercapto |
| 87 | 1,4 | n-butylmercapto | n-butylmercapto |

TABLE II-continued

| No. | Position | X₁ | X₂ |
|---|---|---|---|
| 88 | 1,5 | n-butylmercapto | n-butylmercapto |
| 89 | 1,4 | n-hexadecylmercapto | n-hexadecylmercapto |
| 90 | 1,5 | n-hexadecylmercapto | n-octadecylmercapto |
| 91 | 1,4 | n-octadecylmercapto | n-octadecylmercapto |
| 92 | 1,5 | n-octadecylmercapto | n-octadecylmercapto |
| 93 | 1,4 | methylamino | anilino |
| 94 | 1,5 | methylamino | anilino |
| 95 | 1,4 | methylamino | N-methylanilino |
| 96 | 1,5 | methylamino | N-methylanilino |
| 97 | 1,4 | dimethylamino | anilino |
| 98 | 1,5 | dimethylamino | anilino |
| 99 | 1,4 | methylmercapto | anilino |
| 100 | 1,5 | methylmercapto | anilino |
| 101 | 1,4 | methylmercapto | N-methylanilino |
| 102 | 1,5 | methylmercapto | N-methylanilino |
| 103 | 1,4 | n-butylmercapto | anilino |
| 104 | 1,5 | n-butylmercapto | anilino |
| 105 | 1,4 | n-octadecylmercapto | anilino |
| 106 | 1,5 | n-octadecylmercapto | anilino |
| 107 | 1,4 | methylmercapto | phenylmercapto |
| 108 | 1,5 | methylmercapto | phenylmercapto |
| 109 | 1,4 | n-butylmercapto | phenylmercapto |
| 110 | 1,5 | n-butylmercapto | phenylmercapto |
| 111 | 1,4 | methylmercapto | n-hexadecylmercapto |
| 112 | 1,5 | methylmercapto | n-hexadecylmercapto |
| 113 | 1,4 | methylamino | dimethylamino |
| 114 | 1,5 | methylamino | dimethylamino |
| 115 | 1,4 | methylmercapto | morpholinyl |
| 116 | 1,5 | methylmercapto | morpholinyl |
| 117 | 1,4 | n-hexadecylamino | anilino |
| 118 | 1,5 | n-hexadecylamino | anilino |
| 119 | 1,4 | isopropylamino | anilino |
| 120 | 1,5 | isopropylamino | anilino |
| 121 | 1,4 | anilino | N-methylanilino |
| 122 | 1,5 | anilino | N-methylanilino |
| 123 | 1,4 | methylamino | methylmercapto |
| 124 | 1,5 | methylamino | methylmercapto |
| 125 | 1,4 | dimethylamino | methylamino |
| 126 | 1,5 | dimetylamino | methylamino |
| 127 | 1,4 | dimethylamino | methylmercapto |
| 128 | 1,5 | dimethylamino | methylmercapto |
| 129 | 1,5 | ethylamino | butylamino |

Table III lists compounds of the formula

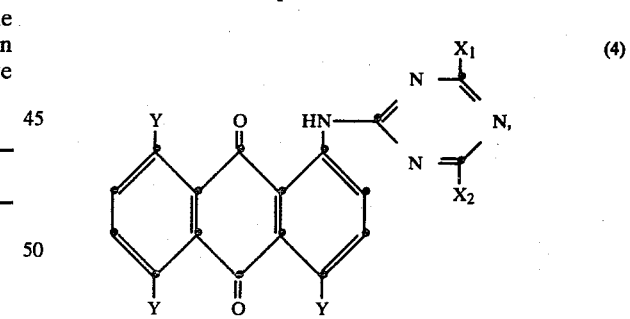

wherein $X_1$ and $X_2$ have the meanings given in columns II and III and Y is as defined in column IV. Column V indicates the position of Y.

TABLE III

| No. | X₁ | X₂ | Y | Position |
|---|---|---|---|---|
| 130 | ethylamino | butylamino | hydroxy | 4 |
| 131 | cyclohexyl-amino | cyclohexyl-amino | hydroxy | 4 |
| 132 | dimethyl-amino | dimethyl-amino | 2,4-bisanilino-triazinyl-6-amino | 4 |
| 133 | N-methyl-anilino | phenylamino | 2,4-bisethyl-aminotriazinyl-6-amino | 4 |
| 134 | N-methyl-anilino | phenylamino | 2,4-bisethyl-aminotriazinyl- | 5 |

TABLE III-continued

| No. | $X_1$ | $X_2$ | Y | Position |
|---|---|---|---|---|
| 135 | N-methyl-anilino | phenylamino | 6-amino 2,4-bisphenyl-mercapto-triazinyl-6-amino | 4 |

It is also possible to use mixtures of different dyes.

Examples of thermoplastics are polyolefins, such as polyethylene, polypropylene or polyisobutylene, also polyvinyl chloride, polystyrene, as well as copolymers of styrene, such as ABS, and especially linear polyesters.

Suitable linear polyesters are in particular those which are obtained by polycondensation of terephthalic acid or an ester thereof with a glycol of the formula HO—(CH$_2$)$_n$—OH, in which n is an integer from 2 to 10, or with 1,4-di(hydroxymethyl)cyclohexane, or by polycondensation of a glycol ether of a hydroxybenzoic acid, for example p-($\beta$-hydroxyethoxy)-benzoic acid. The term "linear polyesters" also comprises copolyesters which are obtained by partial replacement of terephthalic acid by another dicarboxylic acid or by a hydroxycarboxylic acid and/or by partial replacement of the glycol by another diol. However the preferred linear polyester are polyethylene terephthalates.

Colouration is effected by the conventional methods, for example by mixing the colourants with the plastics material in granulate or particulate form and extruding the mixture to fibres, sheets or granules. These latter can then be moulded to objects by injection moulding.

The colouration obtained, especially in polyester, are distinguished by good fastness to light, washing, dry cleaning, cross-dyeing, thermofixation, bleeding and chlorite bleaching, as well as by clear shades and good colour strength.

Russian Pat. No. 192.993 and German Auslegeschrift No. 1 644 532 describe anthraquinone dyes which in the 4-position contain an arylamino group. In contradistinction thereto, the colourants employed in the present invention colour polyester in shades of distinctly better fastness to light and resistance to atmospheric influences.

The invention is illustrated by the following Examples, in which parts and percentages are by weight.

EXAMPLE 1

A non-delustred polyethylene terephthalate granulate suitable for fibre manufacture is shaken in a closed vessel for 15 minutes on a mechanical shaker together with 1% of 1-(2',4'-bis-N-methyl-N-phenylamino-1',3',5'-triazinyl-6')-aminoanthraquinone. The uniformly coloured granules are then spun in a melt spinning machine (285° C.±3° C., sojourn time in the spinning machine about 5 minutes) to filaments, which are stretched and wound on a draw twister. The solubility of the colourant in polyethylene terephthalate results in a strong yellow colouration which is distinguished by outstanding light-fastness, excellent fastness to washing, dry cleaning, cross-dyeing, sublimation and rubbing after thermofixation, and also by excellent resistance to chlorite bleaching and good viscosity values.

EXAMPLE 2

1000 parts of polyethylene terephthalate granules, 10 parts of titanium oxide (Kronos RN 40) and 1 part of finely divided 1-(2',4'-bis-N-methyl-N-phenylamino-1',3',5'-triazinyl-6')-amino-4-hydroxyanthraquinone are mixed in a closed vessel for 2 hours on a roller gear table. The coloured granules are extruded at about 260° C. to strands of 2 mm, which are re-granulated. The resultant granules are processed at 270°-280° C. in a screw injection moulding machine to mouldings. The red coloration obtained is of very good light-fastness.

EXAMPLES 3-42

Table IV lists further colourants of the formula (3) which were used for colouring polyethylene terephthalate by the methods described in Examples 1 and 2. A is the anthraquinonyl radical. The meanings of $X_1$, $X_2$ and m are indicated in columns II, III and IV respectively. The position of the triazinylamino group in the anthraquinone radical is indicated in column V.

TABLE IV

| Example | $X_1$ | $X_2$ | m | Position | Colour |
|---|---|---|---|---|---|
| 3 | methylamino | methylamino | 1 | 1 | yellow |
| 4 | methylamino | methylamino | 2 | 1,5 | yellowish orange |
| 5 | ethylamino | ethylamino | 1 | 1 | yellow |
| 6 | ethylamino | ethylamino | 2 | 1,5 | yellowish orange |
| 7 | n-butylamino | n-butylamino | 1 | 1 | yellow |
| 8 | dimethylamino | dimethylamino | 1 | 1 | yellow |
| 9 | diethylamino | diethylamino | 1 | 1 | yellow |
| 10 | diisopropylamino | diisopropylamino | 1 | 1 | yellow |
| 11 | di-n-butylamino | di-n-butylamino | 1 | 1 | yellow |
| 12 | piperidyl | piperidyl | 1 | 1 | yellow |
| 13 | morpholyl | morpholyl | 1 | 1 | yellow |
| 14 | anilino | anilino | 1 | 1 | yellow |
| 15 | N-methylanilino | N-methylanilino | 1 | 1 | yellow |
| 16 | N-methylanilino | N-methylanilino | 2 | 1,4 | violet |
| 17 | N-methylanilino | N-methylanilino | 2 | 1,5 | reddish yellow |
| 18 | diphenylamino | diphenylamino | 1 | 1 | yellow |
| 19 | phenylmercapto | phenylmercapto | 1 | 1 | yellow |
| 20 | methoxypropionylamino | methoxypropionylamino | 1 | 1 | yellow |
| 21 | isopropoxypropylamino | isopropoxypropylamino | 1 | 1 | yellow |
| 22 | methoxyethylamino | methoxyethylamino | 1 | 1 | yellow |
| 23 | amino | amino | 1 | 1 | yellow |
| 24 | benzylamino | benzylamino |  | 1 | yellow |
| 25 | phenylethylamino | phenylethylamino | 1 | 1 | yellow |
| 26 | diisopropylamino | diisopropylamino | 2 | 1,5 | orange |
| 27 | diisopropylamino | phenylmercapto | 1 | 1 | yellow |
| 28 | Diisopropylamino | p-toluidino | 1 | 1 | yellow |
| 29 | dimethylamino | methylmercapto | 1 | 1 | yellow |
| 30 | methylmercapto | methylmercapto | 1 | 1 | yellow |
| 31 | methylmercapto | butyL-2-mercapto | 1 | 1 | yellow |
| 32 | methylmercapto | methylmercapto | 2 | 1,5 | reddish yellow |
| 33 | N-methylanilino | N-methylanilino | 2 | 1,8 | reddish yellow |
| 34 | methylmercapto | aniino | 1 | 1 | yellow |
| 35 | methylmercapto | phenylmercapto | 1 | 1 | greenish yellow |
| 36 | methylmercapto | o-phenetidino | 1 | 1 | greenish yellow |
| 37 | methylmercapto | p-phenetidino | 1 | 1 | yellow |
| 38 | methylmercapto | 4-chlorophenyl-mercapto | 1 | 1 | yellow |
| 39 | methylmercapto | 2,5-dichlorphenyl | 1 | 1 | yellow |

TABLE IV-continued

| Example | $X_1$ | $X_2$ | m | Position | Colour |
|---|---|---|---|---|---|
| 40 | methylmercapto | 4-methylphenyl | 1 | 1 | yellow |
| 41 | phenylmercapto | morpholino | 1 | 1 | yellow |
| 42 | phenylmercapto | cyclohexyl-1-amino | 1 | 1 | yellow |

EXAMPLES 43-82

Table IV lists further colourants of the formula (4) which were used to colour polyethylene terephthalate by the methods described in Examples 1 and 2. A is the anthraquinonyl radical. The meanings of $X_1$, $X_2$ and Y are given in columns II, III and IV respectively. Column V indicates the position of Y in the anthraquinonyl radical and column VI the shade of the coloured polyester fibres.

TABLE V

| Example | $X_1$ | $X_2$ | Y | Position | Colour |
|---|---|---|---|---|---|
| 43 | ethylamino | ethylamino | hydroxy | 4 | red |
| 44 | ethylamino | ethylamino | benzoylamino | 5 | reddish yellow |
| 45 | anilino | anilino | hydroxy | 4 | red |
| 46 | N-methylanilino | N-methylanilino | hydroxy | 4 | red |
| 47 | N-methylanilino | N-methylanilino | benzoylamino | 5 | reddish yellow |
| 48 | N-methylanilino | N-methylanilino | benzoylamino | 5 | reddish yellow |
| 49 | N-methylanilino | N-methylanilino | phenylmercapto | 4 | red |
| 50 | N-methylanilino | N-methylanilino | phenylmercapto | 5 | yellow |
| 51 | butylamino | butylamino | benzoylamino | 4 | red |
| 52 | cyclohexylamino | cyclohexylamino | benzoylamino | 4 | claret |
| 53 | diethylamino | diethylamino | benzoylamino | 4 | red |
| 54 | diisopropylamino | diisopropylamino | hydroxy | 4 | red |
| 55 | methylmercapto | methylmercapto | 4-chlorbenzoylamino | 4 | red |
| 56 | methylmercapto | butyl-2-mercapto | 4-chlorbenzoylamino | 4 | red |
| 57 | methylmercapto | dimethylamino | phenylmercapto | 5 | yellow |
| 58 | methylamino | methylamino | phenylmercapto | 5 | brownish yellow |
| 59 | N-methylanilino | N-methylanilino | phenylmercapto | 5 | yellow |
| 60 | N-methylanilino | N-methylanilino | 4-chlorphenylmercapto | 5 | yellow |
| 61 | N-methylanilino | N-methylanilino | phenylmercapto | 8 | yellow |
| 62 | methylmercapto | anilino | chlorine | 3 | greenish yellow |
| 63 | methylmercapto | 2-chloranilino | chlorine | 3 | greenish yellow |
| 64 | methylmercapto | 3-chloranilino | chlorine | 3 | greenish yellow |
| 65 | methylmercapto | anilino | chlorine | 4 | yellow |
| 66 | methylmercapto | o-anisidino | chlorine | 4 | yellow |
| 67 | methylmercapto | p-anisidino | chlorine | 4 | yellow |
| 68 | methylmercapto | anilino | chlorine | 6 | yellow |
| 69 | methylmercapto | o-toluidino | chlorine | 5 | yellow |

TABLE V-continued

| Example | $X_1$ | $X_2$ | Y | Position | Colour |
|---|---|---|---|---|---|
| 70 | p-toluidino | p-toluidino | chlorine | 5 | yellow |
| 71 | methylmercapto | anilino | chlorine | 6(7) | yellow |
| 72 | methylmercapto | p-chloranilino | chlorine | 6(7) | yellow |
| 73 | methylmercapto | m-toluidino | chlorine | 6(7) | yellow |
| 74 | dimethylamino | dimethylamino | 2-chlorobenzoylamino | 4 | red |
| 75 | dimethylamino | dimethylamino | 3-chlorobenzoylamino | 4 | claret |
| 76 | dimethylamino | dimethylamino | 2-fluorobenzoylamino | 4 | claret |
| 77 | dimethylamino | dimethylamino | acetylamino | 4 | claret |
| 78 | methylmercapto | phenylmercapto | hydroxy | 4 | red |
| 79 | methylmercapto | phenylmercapto | benzoylamino | 4 | red |
| 80 | methylmercapto | phenylmercapto | benzoylamino | 5 | yellow |
| 81 | phenylmercapto | cyclohexylamino | hydroxy | 4 | red |
| 82 | phenylmercapto | morpholino | hydroxy | 4 | red |

What is claimed is:

1. A process for the mass coloration of a thermoplastic in the melt in which the coloration is effected by incorporating in said thermoplastic in the melt an effective amount of an anthraquinonylaminotriazine of the formula (1)

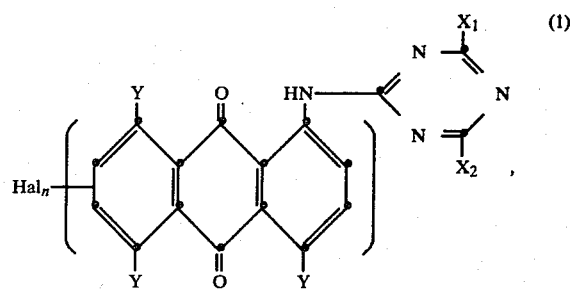

wherein each of $X_1$ and $X_2$ is an alkylmercapto or arylmercapto group or a group of the formula $-NR_1R_2$, in which each of $R_1$ and $R_2$ is alkyl, cycloalkyl, aralkyl or aryl, and $R_2$ can additionally be hydrogen, or $R_1$ and $R_2$ together with the nitrogen atom to which they are attached form a 5- or 6-membered ring or are morpholino, one Y is a hydrogen or chlorine atom, a hydroxy, arylmercapto, alkanoylamino or aroylamino group, or a group of the formula

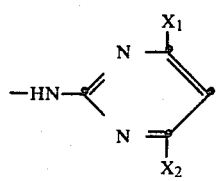

and the other Ys are hydrogen atoms, Hal is a chlorine or bromine atom, and n is 0 or 1.

2. A process according to claim 1, where in the compound of the formula (1), each of $X_1$ and $X_2$ is a group of the formula $-NR_1R_2$, in which $R_1$ and $R_2$ are alkyl groups of 1 to 20 carbon atoms, alkoxyalkyl groups, cycloalkyl groups of 5 to 6 carbon atoms, benzyl or phenylethyl groups or phenyl groups which are unsubstituted or substituted by chlorine atoms, alkyl or alkoxy groups, each of 1 to 6 carbon atoms, and $R_2$ can additionally be hydrogen.

3. A process according to claim 1, where in the compound of the formula (1), $X_1$ is an alkylmercapto group of 1 to 6 carbon atoms or a group of the formula $-NR_1R_2$, in which $R_1$ and $R_2$ are as defined in claim 2 and $X_2$ is an alkylmercapto group of 1 to 6 carbon atoms.

4. A process according to claim 1, where the compound of the formula (1) is

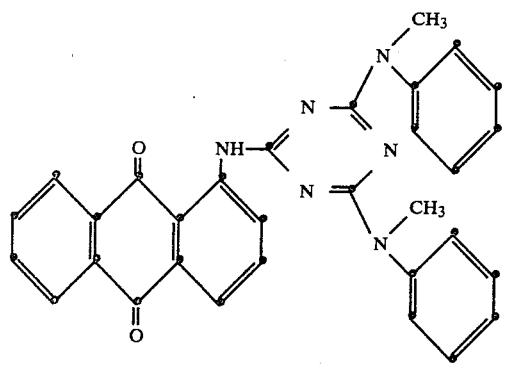

5. A process according to claim 1, where the compound of the formula (1) is

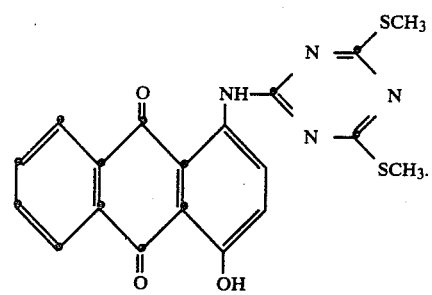

6. A process according to claim 1, where the compound of the formula (1) is

7. A process according to claim 1, where the compound of the formula (1) is

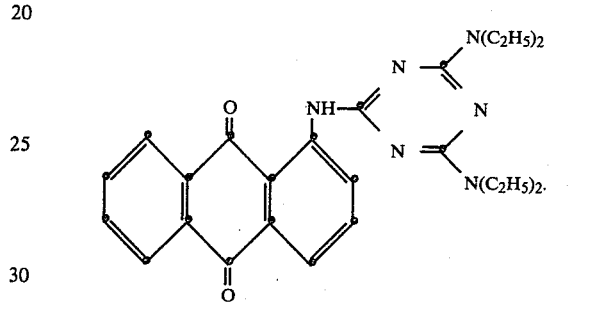

8. A process according to claim 1, where the compound of the formula (1) is

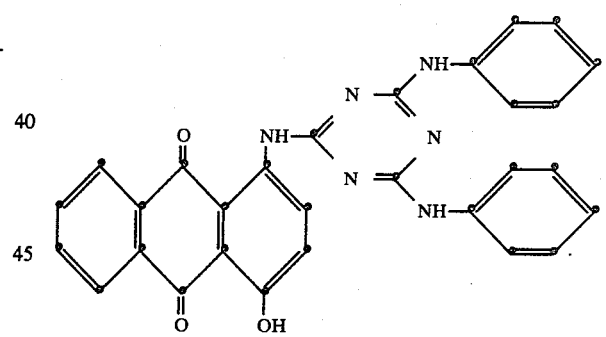

9. A thermoplastic mass colored by the process according to claim 1.

10. A linear polyester mass colored by the process according to claim 1.

* * * * *